Nov. 1, 1949  O. H. BANKER  2,486,815
DRIVING AND STEERING MECHANISM
Filed April 13, 1945  4 Sheets-Sheet 1
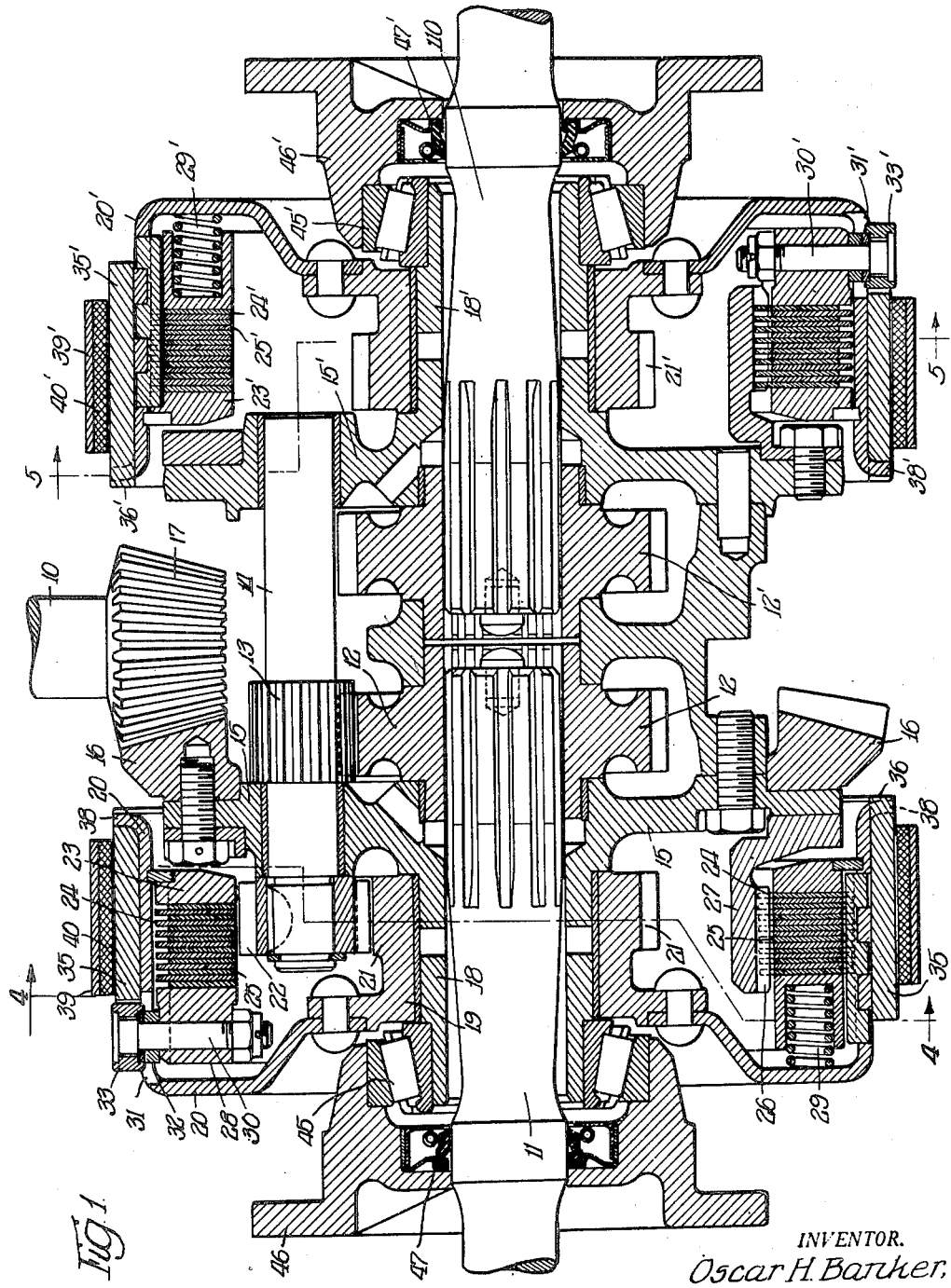
INVENTOR.
Oscar H. Banker,
BY
Cromwell, Greist & Warden
ATTYS.

Nov. 1, 1949   O. H. BANKER   2,486,815
DRIVING AND STEERING MECHANISM
Filed April 13, 1945   4 Sheets-Sheet 2
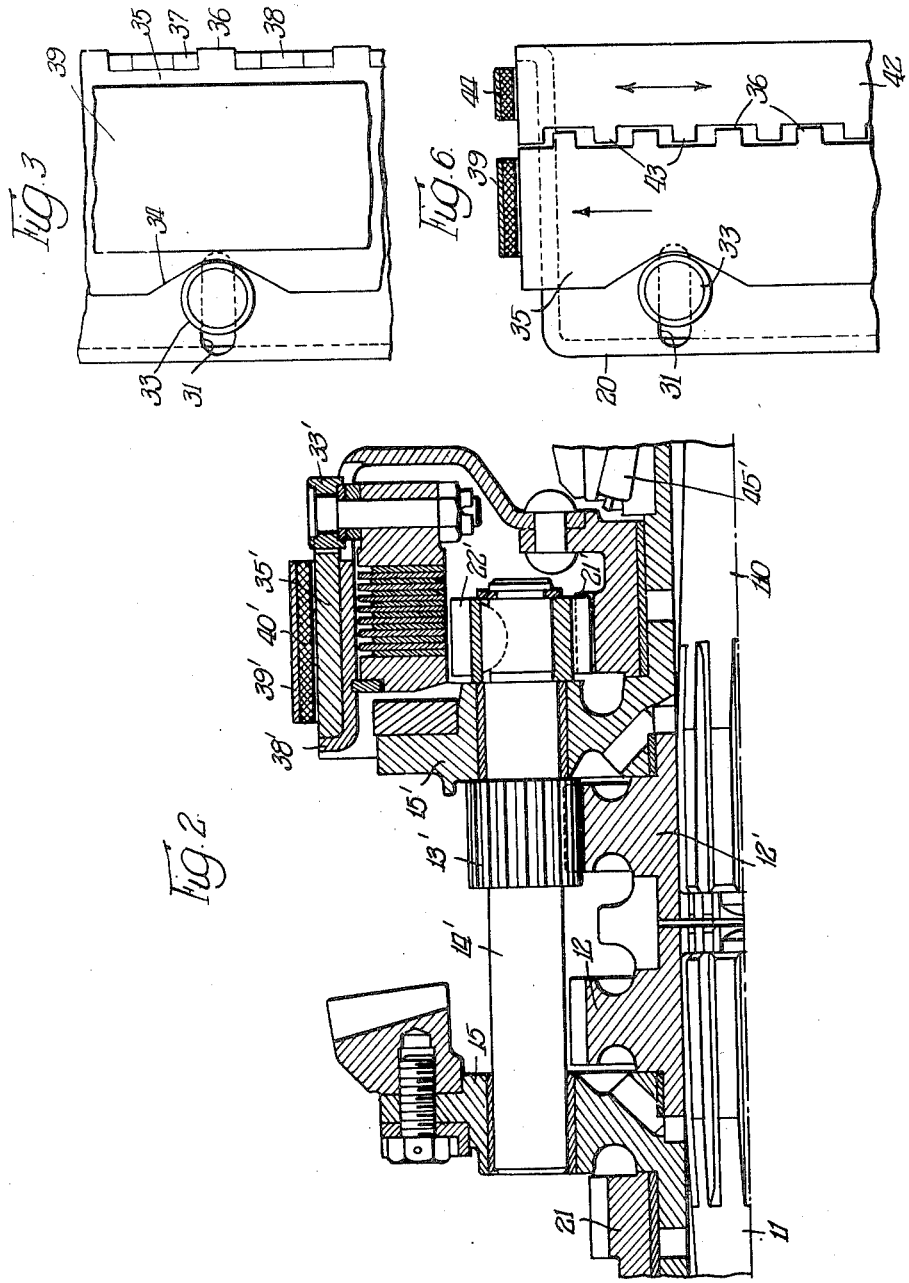

Nov. 1, 1949     O. H. BANKER     2,486,815
DRIVING AND STEERING MECHANISM
Filed April 13, 1945     4 Sheets-Sheet 3
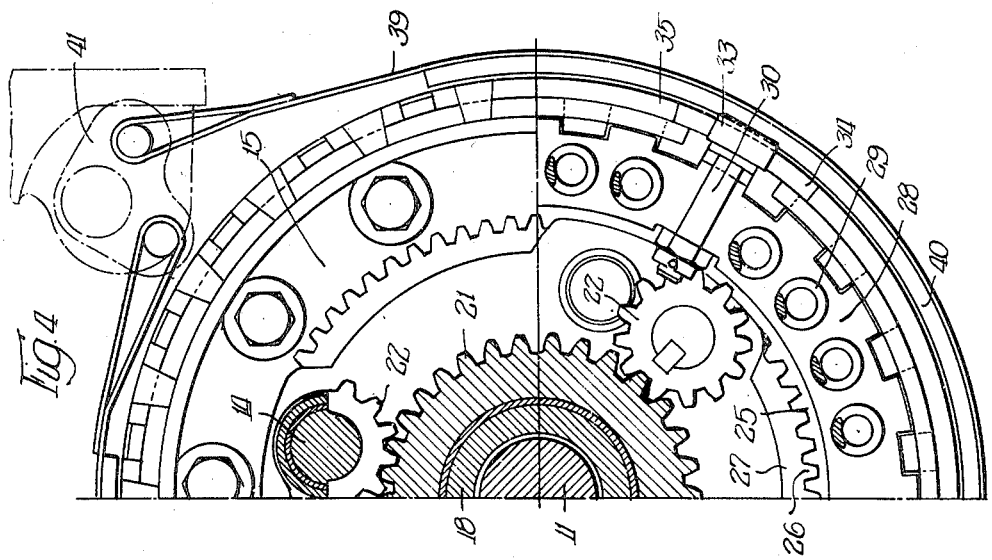
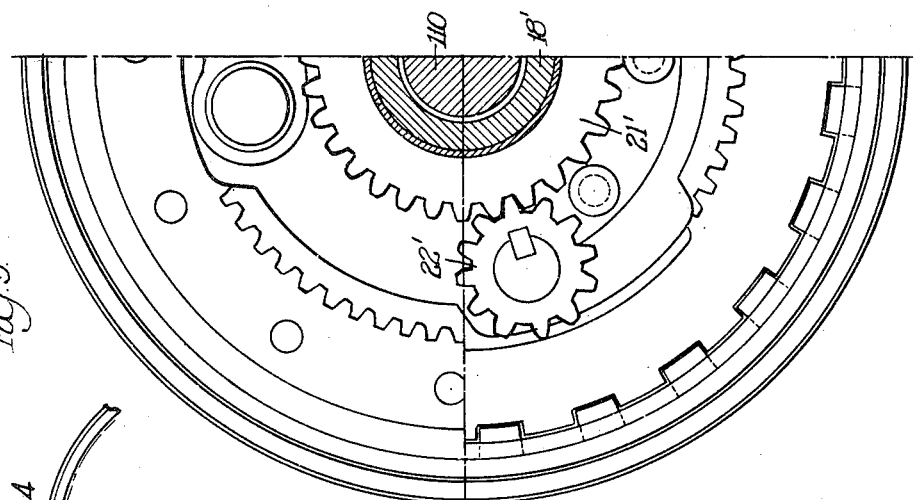
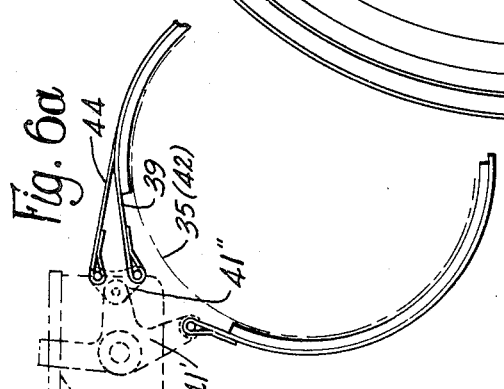
INVENTOR.
Oscar H. Banker,
BY

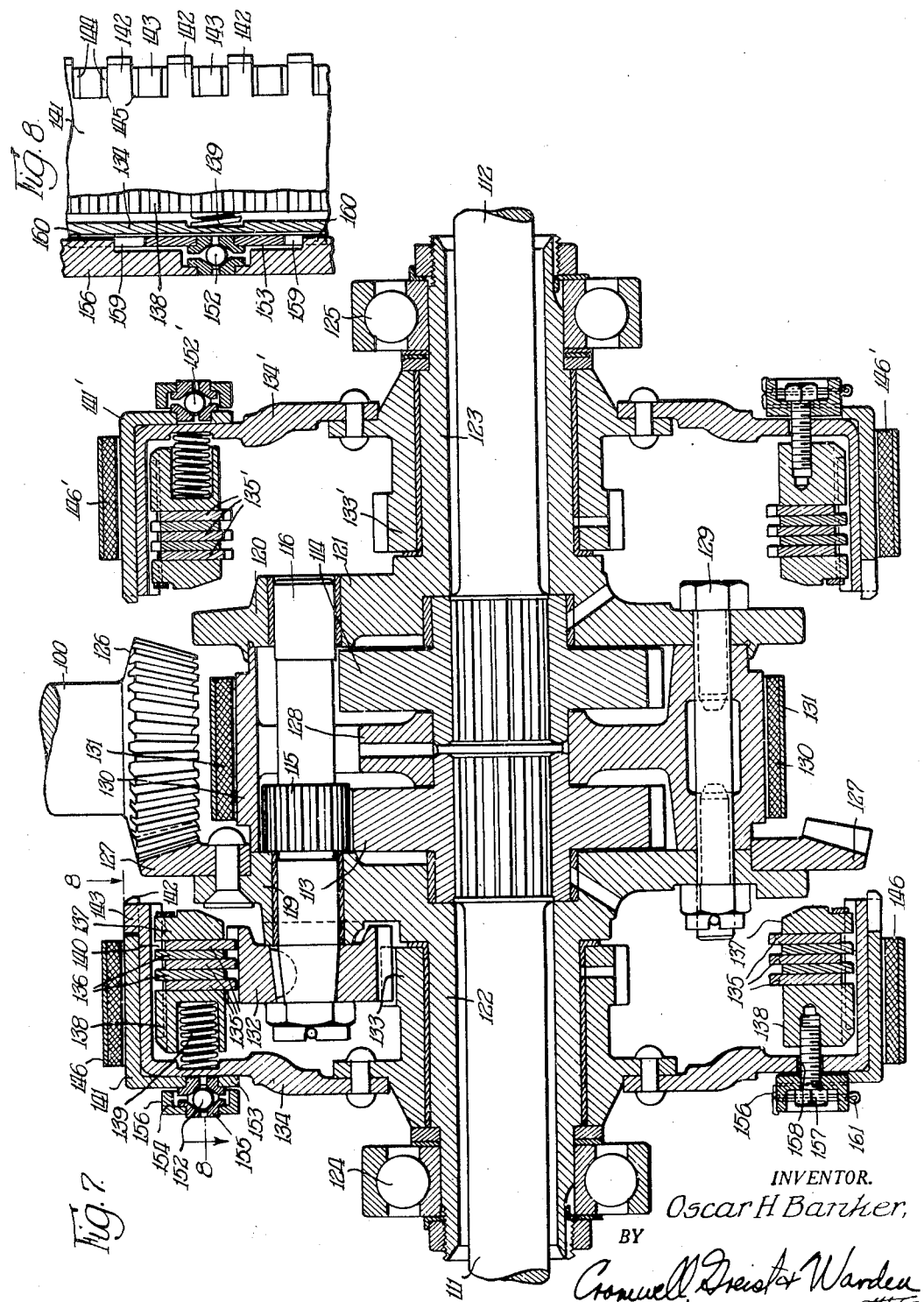

Patented Nov. 1, 1949

2,486,815

UNITED STATES PATENT OFFICE 2,486,815

DRIVING AND STEERING MECHANISM

Oscar H. Banker, Evanston, Ill., assignor to New Products Corporation, Chicago, Ill., a corporation of Delaware Application April 13, 1945, Serial No. 588,222

20 Claims. (Cl. 180—9.2)

This is a continuation in part of my copending application Serial No. 513,037, filed December 6, 1943, and entitled Driving and steering mechanism, which has been expressly abandoned in view of the filing of the present application.

The present invention is primarily directed to a driving and steering mechanism for land vehicles of the crawler or track laying type, whereby the speed and/or direction of travel of said vehicles is controlled, although it will be recognized that certain subcombinations of such mechanism also have utility in a more general sense, as in a change speed mechanism or power transmission.

It is an object of the invention to provide an improved mechanism of the type described which is relatively simple, rugged and wear-resistant in construction, adapted for use over a long period of time with unimpaired operation.

A further object is to provide a mechanism of the type described adapted to drive the shafts of a track laying vehicle either in direct, relatively high speed ratio or a reduced ratio, having provisions of an extremely simple nature for reducing the speed of one shaft relative to the other for turning, which mechanism is of extremely rugged construction and enables the driving and steering stresses to be distributed in such manner as to stand up without failure under the exacting requirements of use in vehicles of this general type.

Yet another object is to provide a driving and steering mechanism of the planetary type for track laying vehicles which includes a planetary change speed unit independently associated with each of the two tracks of the vehicle to drive the same at the same speed or at different speeds independently of one another from a common drive means, in which each of said units comprises a multiple speed ratio control element and means which is automatically operable in response to operation of said control element to alter the speed ratio of the particular planetary unit in question.

A still further object is to provide a tractor driving and steering mechanism of the type referred to in the preceding paragraph, in which said control element and speed ratio altering means have overlapping or merged operation in the sense that actuation of the latter to alter said speed ratio commences prior to termination of the control action of the former, whereby to produce a cushioned yet instantaneously responsive change in the operating ratio of each of the planetary units, independently of one another, and wherein the tracks of the vehicle are under power at all times, thereby affording positive control in any driving phase.

Another object is to provide a multiple speed ratio planetary power transmission unit which is particularly suited for use in a driving and steering mechanism of the sort referred to in the preceding paragraphs.

Other more specific objects and advantages of the invention will be apparent to those skilled in the art upon a full understanding of the operation of the mechanism.

Desired embodiments of the invention are presented herein by way of exemplification but it will of course be appreciated that the invention is susceptible of incorporation in other structurally modified forms coming equally within the scope of the appended claims.

In the drawings,

Fig. 1 is a view in horizontal section through a preferred form of driving and steering mechanism embodying the improvements of the present invention;

Fig. 2 is a sectional view generally similar to Fig. 1, in which the mechanism is viewed at another radial point;

Fig. 3 is a fragmentary plan view of a portion of a clutch throw-out device embodied in the mechanism;

Figs. 4 and 5 are views in transverse vertical section taken respectively on lines corresponding generally to lines 4—4 and 5—5 of Fig. 1;

Fig. 6 is a view generally similar to Fig. 3, illustrating a modified clutch throw-out device having further improved features;

Fig. 6A is a fragmentary schematic view, illustrating an arrangement for operating the modified device shown in Fig. 6;

Fig. 7 is a horizontal section, generally similar to Fig. 1, through a modified embodiment of the driving and steering mechanism; and Fig. 8 is a fragmentary section, taken on line 8—8 of Fig. 7.

In the drawings, particularly in Fig. 1, wherein a preferred embodiment of the invention is illustrated, the reference numeral 10 designates one end of an elongated forward-to-rearward propeller shaft which drivingly connects the present mechanism to the prime mover of the vehicle. This vehicle will be assumed to be a vehicle of the crawler or track laying type, although the features of the invention are not to be regarded as necessarily limited to this application. The reference numerals 11 and 110 designate a pair of transverse, axially aligned driven shafts extending laterally of the vehicle and connected with the drive for the track laying mechanism (not shown). The present invention provides a drive for shafts 11 and 110 from propeller shaft 10, either in direct or reduced speed ratio, with both shafts 11, 110 rotating at the same speed, or in different speeds of the shaft 11 relative to the shaft 110 or vice versa, whereby turning movement of the vehicle is accomplished.

In view of the fact that the structure associated with shaft 11, through which it derives its drive from propeller shaft 10, is identical with that associated with the shaft 110 to the same end, the mechanism will be particularly described with reference to component parts associated with shaft 11, with the understanding that similar structural features associated with shaft 110 are similarly designated, with the reference numerals or characters therefor primed. Shaft 11 has splined thereon a power take-off sun gear 12 which meshes outwardly with a plurality of circumferentially spaced planet gears 13 on stub shafts 14 paralleling shaft 11. Shafts 14 are appropriately journaled in bushings in the fixedly connected rotatable planet gear carriers 15, 15', which are arranged concentrically and coaxially of shafts 11, 110. Carrier 15 is provided, on the side thereof adjacent planet gears 13, with a bevel ring gear 16 in mesh with a bevel gear 17 on propeller shaft 10, through which the drive for the mechanism is received. As indicated in Fig. 4, the planet gears 13 and shafts 14, 14' are spaced at uniform intervals around the shaft 11 and circumferentially of the carrier 15. Said planet gear carrier has an axially extending hub or sleeve portion 18 on which is rotatably journaled the hub 19 of a drum 20 and said hub 19 is provided with a second external sun gear or reaction member 21 meshing with planet gears 22 on stub shaft 14. Said planet gears 22 are located on the side of carrier 15 opposite the planet gears 13, and to permit assembly, gears 22 are keyed to shaft 14.

On its inner surface the drum 20 has splined thereto a clutch end stop ring 23 suitably restrained against movement axially of the drum and a plurality of clutch rings or disks 24 of suitable braking material. These disks 24 coact with alternately disposed similar clutch rings or disks 25 in the manner of a multiple disk clutch, the disks 25 being splined to the external teeth 26 of arcuate segments 27 which are secured to the gear carrier 15. Referring to Fig. 4, it will be noted that the spaces between said segments 27 are occupied by the transversely aligned planet gears 22.

The friction clutch disks 24 rotate with the drum 20 and are axially movable relative thereto, while the disks 25 rotate with carrier 15 and are axially movable thereto, so that when the disks are frictionally engaged by end pressure applied thereto, the drum rotates as a unit with the gear carrier. Such rotation of the drum and carrier as a unit results in the direct transmission of driving torque from the driven carrier 15 to sun gear 12 and shaft 11, by reason of the locked condition of planet gears 22, 13 in engagement with sun gear or reaction member 21 and power take-off sun gear 12. End thrust to accomplish said frictional interconnection of the multiple disk clutch is applied by an annular clutch thrust ring 28 which is, like the disks 24, splined to drum 20 for rotation therewith and axial movement relative thereto. Thrust ring 28 is spring urged for thrust engagement with the clutch disks by a plurality of circumferentially spaced coil springs 29 engaging the ring and drum so as to urge ring 28 against the outermost clutch disk, as clearly shown in Fig. 1.

Thrust ring 28 also carries a radially disposed post 30 extending through an elongated axial slot 31 (see Figs. 1 and 3) in the outer periphery of drum 20, said post being guided for axial movement in said slot by a shoe 32 surrounding the post inwardly of its outer radial extremity. It will be understood that this axial sliding movement is performed as the post 30 rotates with drum 20, without relative rotative movement of the post and thrust ring 28 with reference to the drum, due to the splined connection.

At its radially outermost end the post 30 carries a rotatable cam roller 33. This cam roller is disposed in a lateral, angular sided cam recess 34 of an annular brake drum or rim 35 surrounding drum 20. Rim 35 is capable of predetermined slight rotation on drum 20, being drivingly connected thereto by the lugs 36 on the lateral face thereof opposite recess 34, which lugs project into the spaces 37 lying between radially struck-out fingers 38 on drum 20. The lugs 36 are circumferentially narrower than the spaces between drum fingers 38 and are normally centered in said spaces. Hence, while rim 35 and drum 20 normally rotate together, upon stoppage or retardation of rotation of rim 35 the drum will continue to rotate a few degrees relative to the rim. This angular movement of the drum relative to the rim suffices to cause cam roller 33 to move up the inclined side of the lateral cam recess 34, thus camming the clutch thrust ring 28 outwardly and releasing the clutch constituted by the multiple disks 24, 25. Braking of the rim 35 is accomplished by the circumferential brake band 39 provided with suitable braking material 40 on its inner surface and actuated by a suitable linkage generally designated 41 in Fig. 4, in a well known manner.

It has been pointed out that as drum 20 rotates as a unit with the planet gear carrier 15, a direct drive of shaft 11, 110 results. When brake band 39 is applied to rim 35 to halt the same, the first result is the aforesaid outward camming of clutch ring 28 and release of the clutch. This release, regardless of the direction of rotation of the drum, immediately decouples drum 20 from its previous fixed drive by carrier 15, and thereafter the engagement of rim lugs 36 and drum fingers 38 results in stoppage or retardation of rotation of drum 20 and its reaction member 21. This enables planet gear 22 to travel around said reaction member, rotating on its own axis, with a resultant reduction in the speed of rotation transmitted to take-off gear 12 and shaft 11.

A noteworthy feature of advantage of the above described clutch throw-out device when combined with a planetary mechanism of the present type is the very desirable smoothness, flexibility and freedom from "grabbing" action in the operation of the automatic de-clutching parts. In explanation of this action, the application of brake band 39 results in disengagement of the clutch in the manner described with consequent relative rotation of the gear carrier 15. However, the reaction of the planetary 22 on the reaction member 21 as the result of rotative driving engagement is in the opposite direction, i. e., in a direction tending to cause re-clutching of the clutch members even though to a minor and almost unnoticeable degree. This tendency to re-clutch is sufficient to bring the cam provisions into operation so as to nullify the tendency referred to. This cycle repeats as long as the brake is retarded. Actual and full pressure re-engagement of the clutch plates under full force of springs 29 does not take place, but, on the contrary, merely a repeated reversing drift in the direction toward and out of clutch engagement, accompanied by a tendency to alternate full and diminished relative slippage of the clutch plates. The operator is thereby afforded a more or less flexible, non-rigid and non-grabbing control of the respective shafts 11, 110 in effecting long or abrupt turns, i. e., a degree of "feel" and better control.

It will be understood that an exactly similar mode of operation follows upon the application of brake band 39' to rim 35', resulting in decoupling of drum 20' from carrier 15', hence causing rotation of planet gear 22' about its own axis as it is carried around stationary reaction member 21'. This causes a reduced forward speed of shaft 110.

From the foregoing it is to be observed that the clutch structure couples reaction gear 21 for rotation with gear carrier 15 and decouples these elements when rotation of the reaction member is halted or retarded. The reaction gear 21 serves as a speed control member determining the speed of rotation of shaft 11. I have illustrated a brake assembly including drum 20 fixed to the reaction member as a means to govern the speed of the latter, but it will be appreciated that various means other than such a rotatable drum can be utilized for this purpose. Hence, in certain of the claims it is to be understood that the expression "control member" may be construed to signify either, on the one hand, the basic reaction member, or, on the other, the drum or a similar element or elements associated with said reaction member, fixedly or otherwise, in order that its speed may be reduced as desired.

The arrangement of braking and clutching units and the actuating provisions therefor are inherently such that the operation of disengaging the clutch elements, attended by planetary action in either or both of the planetary power transmission units of the driving and steering mechanism, is initiated prior to full completion of the braking of the reaction member of the unit in question. This results in a cushioned, shock-free transition in speed ratio in either direction, yet without loss of the positive control and fingertip responsivity which characterize the mechanism as a whole. Both tracks of a tractor powered by the mechanism are positively driven in high or low speed ratio, neither idling, so that positive turning control is had at all times.

Regardless of whichever drum 35, 35' is applied to halt or retard its respective reaction member 21, 21', it will be noted that the torque reaction exerted on the planet gears 22, 22' will normally hold or tend to hold the clutch release cam rollers 33, 33' in an operative clutch release position upwardly on the inclined cam surfaces 34, 34' in an entirely satisfactory manner. Under certain conditions, however, there may be a tendency to retrograde travel of the rollers downwardly on said cam surfaces 34, i. e., axially inwardly of the respective rims 35, 35', with a resultant objectionable chatter or knock, as the clutch is released while the brake is still applied. To insure against this, I have proposed the improvements embodied in the slightly modified arrangement of the drum and rim illustrated in Fig. 6. It will be apparent that these improvements are readily applicable to the embodiment of Figs. 1 to 5 (and are so intended), also to the further structural modification shown in Figs. 7 and 8, to be described.

Referring to Figs. 6 and 6a, in which elements common to the form of Figs. 1 to 5 are similarly designated, the drum 20 is rotatably surrounded by the brake rim 35, with which brake band 39 coacts, and at the side thereof opposite cam roller 33, has secured thereto, as by riveting, a further annular brake ring 42. This ring is provided with laterally extending drive lugs 43 located in the spaces between the rim drive lugs 36, and capable of relative rotation with respect thereto in the same manner as the lugs 36 and fingers 38 of the form shown in Figs. 1 to 5. Hence, upon stoppage or retardation of rotation of rim 35 and consequent slight lost motion of drum 20 relative thereto, the drum 20 and associated reaction element 21 will be similarly stopped or retarded.

The ring 42 has associated therewith a brake band 44, which ring and band may have lesser transverse width than the rim 35 and brake band 39, in view of the lesser torque which it absorbs. Said band is interconnected in a suitable manner, readily understandable by those skilled in the art, with the linkage for applying band 39 whereby brake band 44 is applied to the ring 42 after retardation of rotation of rim 35 and drum 20 has been accomplished. Upon such application of band 44, the ring 42 and drum 20 will thereafter be held in such position, with cam roller 33 on inclined cam surface 34, as to maintain clutch ring 28 in clutch release position and preventing the retrograde inward movement of the cam roller 33 and clutch ring 28 referred to above. This eliminates the possibility of the chatter or noise mentioned above.

In Fig. 6a I illustrate a very simple mechanism for applying the bands 39, 44 referred to above. This comprises a lever operated bell crank 41' similar to that employed in the linkage 41 in Fig. 4, which is medially pivoted on a fixed support. The corresponding ends of each of the bands 39, 44 have a common point of attachment to one arm of the bell crank 41', while the opposite end of each of the bands is brought around the rim 35 and ring 42 respectively, being carried at this point on two spaced pins on a walking beam or equalization element 41'', the latter being centrally pivoted on the other arm of the bell crank 41'. Accordingly, when said bell crank is actuated counterclockwise, bands 39, 44 will be tightened against rim 35 and ring 42 respectively, the lost motion connection referred to permitting the further travel of drum 20 which has been discussed.

It will be noted, in connection with the tensioning of the brake applying device illustrated in Fig. 6a, that actuation of bell crank 41' results in tensioning both bands 39, 44 simultaneously; however, the former, which acts on the loose rim 35, is wider than the latter, which acts on ring 42, i. e., in effect on the drum 20. Thus, when the band 39 engages rim 35, the latter immediately halts since there are no positive forces acting on it at the instant of brake application, while the ring 42 and attached drum continue to rotate a few degrees, slipping under band 44. This relative rotation releases the clutch in the manner described, and, as soon as released, both bands exert full braking action, holding drum 20 and reaction gear 21 stationary or retarded. When the direction of driving torque is reversed, as in a situation where the engine is driven by the momentum of the vehicle, rather than in the normal driving relationship, all of the force necessary to hold the reaction member is exerted by the band 44 on ring 42, but since the reaction torque at such time is only about one-tenth the normal driving torque, and in the forward rather than backward direction, ample frictional braking capacity is present to control or halt the reaction gear 21.

The above described rotatable components of the driving and steering or like mechanism are suitably mounted for rotation in an improved and highly distortion-resistant manner. A roller bearing 45 is provided for the sleeve extensions 18, 18' of the planet gear carriers 15, 15' in bearing members 46, 46'; likewise, suitable shaft sealing provisions, designated by the reference numerals 47, 47', are employed to prevent leakage of lubricant externally of the mechanism. It should be noted that the power take-off sun gears 12, 12' are internally journaled in the respective gear carriers 15, 15' on the sleeve extensions 18, 18' of which the drums 20, 20' are likewise journaled. A bearing is provided by the carriers both at the opposite axial sides of the take-off gears 12, 12' and intermediate the same, so that a very rigid, rugged and distortion-resistant mounting for the rotatable parts is accomplished.

To recapitulate, a direct drive of both shafts 11, 110 at the same speed is attained when both brake bands 39, 39' are slacked off and the drums rotate as a unit with the connected gear carriers 15, 15'. Simultaneous application of both bands causes drive of both shafts at similar reduced speed. Application of either brake band, with the other slacked off, results in reduction of speed of the shaft corresponding to the braked band relative to the other and resultant turning of the vehicle. As is apparent, the relative size of the gears 13, 22 determines the extent of the aforesaid speed reduction, and, if desired, one or both of the shafts 11, 110 may be reversed in their direction of rotation, if said gears are properly designed in size to that end. The parts for accomplishing these results are very simple and comparatively inexpensive in transmissions or control devices of the present character.

It will be appreciated that the present mechanism may be readily adapted by relatively simple variations in design to afford an exceedingly large range of speed and power ratio variations during the phase of its operation in which the planetaries rotate. Appropriate correlation of the angle of cam 34 (of which that shown is merely diagrammatic or illustrative) and the force of the clutch engaging springs enable disengagement of the clutch without positive locking of the brake drum. This enables the drum to slip variably according to the amount of braking force applied, with corresponding variation in the relative rotation of reaction member 21 and planetary carrier 15. The number of disks or plates embodied in the clutch is also a factor of design which will enter into the obtaining of a theoretically infinite range of power ratios produced in this manner.

A tractor driving and steering mechanism is provided in which control of both tracks is accomplished independently, as distinguished from certain prior art planetary systems in which differential action involving speeding up of one track as a consequence of retarding the other is involved. Moreover, the control of the respective sides of the tractor is effected by correlated means for de-clutching the reaction gear involved from the planetary carrier and braking of the reaction member as an automatic operation, in which the slight relative movement of the inner brake drum relative to the outer immediately produces de-clutching action. For this operation, it is necessary for the driver to manipulate only a single control, as distinguished from prior controls in which braking members and de-clutching members are individually and separately manipulated. A much greater ease of operation naturally results.

In Figs. 7 and 8 I illustrate a somewhat modified embodiment of the invention, characterized generally by the same brake-clutch control structure. As in the embodiment of Figs. 1 to 5, certain of the parts on the right-hand side of the mechanism are designated by the same reference numerals primed, as corresponding left-hand parts.

The mechanism shown in the drawings includes a driving shaft 100 and two driven shafts 111 and 112. The driving shaft 100 extends longitudinally of the vehicle and is connected with the engine (not shown), while the driven shafts 111 and 112 extend laterally of the vehicle and are connected with the driving members (not shown) of the track laying mechanisms.

The shafts 111 and 112 are provided respectively with power take-off sun gears 113 and 114. The sun gear 113 meshes outwardly with a plurality of planet gears 115 which are secured to stub shafts 116, while the sun gear 114 meshes outwardly with a plurality of similar planet gears which are secured to stub shafts paralleling shafts 116. The stub shafts are journaled adjacent their ends in side portions 119 and 120 of a planet gear carrier 121. The carrier 121 is arranged concentrically of the shafts 111 and 112 and is provided with tubular hub portions 122 and 123 which surround the shafts 111 and 112 and are journaled respectively in bearings 124 and 125. The stub shafts which carry the planet gears are spaced at regular intervals circumferentially about the carrier as in the embodiment of Figs. 1 to 5.

The carrier 121 is driven from the driving shaft 100 by a bevel pinion 126 on the shaft which meshes with a bevel gear 127 on the carrier. The side portions 119 and 120 of the carrier are arranged at opposite sides of a center portion 128, and all three portions are clamped together by a plurality of circumferentially spaced bolts 129. The outer periphery of the center portion 128 is shaped to provide a drum 130 for coaction with an encircling but normally spaced brake band 131.

The planet gear shafts 116 project from the left side of the carrier 121 and are provided on their projecting ends with additional planet gears 132 which gears are larger than the planet gears 115 and mesh inwardly with a sun gear or reaction member 133. The sun gear 133 is journaled on the tubular hub portion 122 of the carrier and is connected with a drum 134.

The planet gears 132 mesh outwardly with a plurality of inwardly toothed disks 135. The disks 135 form in effect an internal gear and are loosely interleaved with outwardly toothed disks 136. The disks 136 coact frictionally with the disks 135 to provide a multiple disk clutch. They are adapted to be pressed into tightly clamped engagement between an outwardly toothed stop ring 137 and an outwardly toothed pressure ring 138 by a plurality of circumferentially spaced coil springs 139. The springs 139 are arranged under compression between the pressure ring 138 and the adjacent side of the drum 134. The disks 136, the stop ring 137 and the pressure ring 138 are all locked against circumferential movement with respect to the drum 134 by axially extending spline portions 140 on the inner periphery of the drum, which spline portions fit within the toothed outer portions of such members. The spline portions 140 permit the disks 136 and the pressure ring 138 to move axially toward the stop ring 147 under the action of the springs 139 to hold the internal gear disks 135 against circumferential movement relative to the drum 134.

As the drum 134 is secured to the sun gear 133 the planet gears 132 are prevented from rotating as long as the disks 135 and 136 are clutched together, causing the carrier 121 and all the gears associated with the same to rotate as a unit about the axis of the carrier and producing in effect a direct drive for the driven shaft 111.

The drum 134 is enclosed within a second brake rim or drum 141. The drum 141 is coupled to the drum 134 by means of axially projecting fingers 142 which fit between radially extending lugs 143. The lugs 143 are narrower than the spaces present between the fingers 142 and are normally centered in such spaces with their edges 144 spaced circumferentially with respect to the opposed edges 145 of the fingers, whereby when the drum 141 is brought to a stop the drum 134 will also come to rest but not until after it has moved a little farther than the drum 141. The drum 141 is adapted to be brought to a stop by means of a brake band 146, which band encircles the drum 141 in normally spaced relation to the same. The band 146 is anchored to a stationary portion of the vehicle by a link and is adapted to be contracted about the drum 141 in a well known manner.

After the drum 141 has been brought to a stop by the band 146 the momentarily continued movement of the drum 134 serves to automatically unclutch the internal gear disks 135 from the drum 134 through the medium of a plurality of cam members 152. The cam members 152 are spaced circumferentially about an inwardly extending annular flange 153 on the drum 141 and consist of balls which are positioned between cone-shaped socket members 154 and 155. The socket members 154 are seated in recesses formed in the annular flange 153 of the drum 141, while the socket members 155 are seated in recesses formed in a ring 156. The ring 156 is of substantially the same size as the annular flange 153 and is positioned on the opposite side of the flange 153 from the drum 134. The ring 156 is rigidly connected at circumferentially spaced intervals with the pressure ring 138 by means of machine screws 157 which pass through openings 158 in the drum 134. The drum 134 is provided opposite the ring 156 with slots 159 in which circumferentially spaced portions 160 of the ring are disposed, with the ends of the ring portions 160 spaced far enough from the ends of the slots 159 to allow for the relative movement between the ring 156 and the drum 141.

The ring 156 is spaced slightly from the outer face of the drum 134 when the disks 135 are clutched with the disks 136. The point at which the disks become unclutched in the momentarily continued movement of the drum 134 may be adjusted with exactness by turning the screws 157 one way or the other. The screws are maintained in any desired position of adjustment by removable cotter pins 161 which pass through registering openings in the heads of the screws and the edges of the ring 156.

The momentarily continued movement of the ring 156 along with the drum 134 will cause the balls 152 to ride up on the sides of the socket members 154 and 155, thereby forcing the ring 156 axially away from the drum 134 and unclutching the disks 135 from the drum 134 against the yielding resistance of the springs 139. After the disks 135 have been unclutched in this manner, they will remain unclutched and the drum 134 will remain stationary as long as the brake band 146 remains constricted. In this condition of the mechanism the sun gear 133 is held stationary and the disks 135 are allowed to rotate freely within the then stationary drum 134, permitting the stub shafts 116 and the planet gears 115 and 132 thereon to rotate about their own axes while revolving with the carrier 121. This results in the driven shaft 111 continuing to turn forwardly but at a reduced speed, the amount of reduction depending on the difference in size between the planet gears 115 and 132. As pointed out above, a reversal in the direction of drive of the shafts 111, 112 may also be had by proper proportioning of the relative sizes of the gears.

It will be understood from the foregoing that when the brake band 146 is applied, the speed of rotation of the driven shaft will be reduced and such reduction will continue until the brake band 146 is released.

The driven shaft 112 is operated from the driving shaft 100 through the planet carrier 121 in exactly the same manner as the driven shaft 111 but through a different gear train. As the gear train for the driven shaft 112 is identical with the one for the driven shaft 111, it need not be further described.

Under normal conditions the driving shaft 100 will operate the driven shafts 111 and 112 at the same speed, causing the vehicle to travel in a straight line. In order to cause the vehicle while moving to turn toward one side or the other, it is merely necessary to contract either the brake band 146 or the brake band 146', depending on the direction in which the vehicle is to be turned. If the vehicle is to be turned to the left, the left-hand brake band 146 is applied, as long as necessary to complete the turn, while if it is to be turned to the right, the right-hand brake band 146' is similarly applied. If desired, the brake bands 146 and 146' can be applied simultaneously in order to obtain a greater multiplication of torque at a reduced speed with the vehicle still continuing in the same direction. This mechanism will operate while the vehicle is being driven either forward or backward, since the socket members 154 and 155 which embrace the balls 152 are so inclined as to give a camming action in either direction. The vehicle can be brought to a stop in either direction by operating the brake band 131. A very abrupt turning action may be produced if the planetaries are designed in their relative proportions to effect reversal of the direction of shaft drive upon selective application of the brake bands, as mentioned above. A wide range of turning characteristics is thus made available by selective actuation of either shaft in a different ratio, either forward or reverse, than its direct drive speed.

The combined braking and clutching devices at each side of the mechanism cooperate with the planetary gear trains with which they are associated, in either of the embodiments, to provide a very effective means for use in both driving and steering a crawler type vehicle. While such devices are especially well suited for that purpose, it will of course be appreciated that either of the side controls or portions thereof might be used independently of the other as a transmission or as a part of a transmission for other purposes.

The auxiliary brake 42 for the reaction member 21 and attached drum 20 insures chatter-free operation at all times. As stated, the reaction of planetary gear 22 will normally serve to hold cam roller 33 in clutch releasing position on cam 34 during the time that the engine is driving the vehicle through the present mechanism. However, during such times as the situation is reversed, with the vehicle ahead of the engine, it will be seen that the aforesaid reaction would be nullified, due to reversal of the rotative gear thrust. Hence, lacking brake band 42 to maintain the drum 20 and roller 33 in clutch release position, the clutch would re-engage while brake 39 was still applied, with consequent jar and chatter. The provisions shown in Fig. 6 prevent this situation from arising.

I claim:

1. In a driving and steering mechanism characterized by two axially aligned driven elements, a gear carrier in concentric relation thereto, means for rotating the carrier and separate gear trains independent of one another between said carrier and the respective driven elements, the improvement comprising, in each of said gear trains, a sun gear connected with one of the driven elements, a second relatively small sun gear rotatable with respect to said driven element, a planet gear rotatably mounted in the carrier and meshing with the first mentioned sun gear, a second relatively large planet gear connected with the first mentioned planet gear and meshing with the second mentioned sun gear, an internal gear meshing with said second planet gear and releasably connected with said second sun gear for rotation with the latter, means for stopping the rotation of said second mentioned sun gear, and means for automatically releasing the internal gear from said second sun gear when the rotation of the latter is stopped, whereby to cause said driven element to rotate at a reduced speed under an increased multiplication of torque.

2. In a driving and steering mechanism characterized by two axially aligned driven elements, a gear carrier in concentric relation thereto, means for rotating the carrier and separate gear trains independent of one another between said carrier and the respective driven elements, the improvement comprising, in each of said gear trains, a sun gear connected with one of the driven elements, a second relatively small sun gear rotatable with respect to said driven element, a planet gear rotatably mounted in the carrier and meshing with the first mentioned sun gear, a second relatively large planet gear connected with the first mentioned planet gear and meshing with the second mentioned sun gear, an internal gear meshing with said second planet gear and releasably connected with said second sun gear for rotation with the latter, means for stopping the rotation of said second sun gear, and means for releasing the internal gear from said second sun gear.

3. In a driving and steering mechanism characterized by two axially aligned driven elements, a gear carrier in concentric relation thereto, means for rotating the carrier and separate gear trains independent of one another between said carrier and the respective driven elements, the improvement comprising, in each of said gear trains, a sun gear connected with one of the driven elements, a second relatively small sun gear rotatable with respect to said driven element, a planet gear rotatably mounted in the carrier and meshing with the first mentioned sun gear, a second relatively large planet gear connected with the first mentioned planet gear and meshing with the second mentioned sun gear, an internal gear meshing with said second planet gear and releasably connected with said second sun gear for rotation with the latter, means for stopping the rotation of said second mentioned sun gear, and means for automatically releasing the internal gear from said second sun gear when the rotation of the latter is stopped, whereby to cause said driven element to rotate at a reduced speed under an increased multiplication of torque.

4. In a driving and steering mechanism characterized by two axially aligned driven elements, a gear carrier in concentric relation thereto, means for rotating the carrier and separate gear trains independent of one another between said carrier and the respective driven elements, the improvement comprising, in each of said gear trains, a sun gear connected with one of the driven elements, a second relatively small sun gear rotatable with respect to said driven element, a planet gear rotatably mounted in the carrier and meshing with the first mentioned sun gear, a second relatively large planet gear connected with the first mentioned planet gear and meshing with the second mentioned sun gear, a drum connected with said second sun gear, an internal gear meshing with said second planet gear, a clutch for releasably securing the internal gear to the drum, a second drum encircling the first mentioned drum, a brake for stopping the rotation of the outer drum, a connection between the outer and inner drums for permitting the inner drum to continue rotating momentarily through a small angle after the rotation of the outer drum has been stopped, and means responsive to the continued movement of the inner drum relative to the outer drum for releasing the clutch securing the internal gear to the inner drum.

5. In a power transmission mechanism, a driving member, a driven element, means connected to the driving member to drive said element from said driving member in a predetermined speed ratio including a rotatable reaction member adapted to have the rate of rotation thereof altered, planetary means connected to said driven element and reaction member to transmit power therebetween, releasable means normally drivingly interconnecting said reaction and driving members, means for altering the rate of rotation of said reaction member comprising a speed control member having means drivingly connecting the same to the reaction member and permitting limited lost motion rotation relative to the latter, means coacting with said speed control member to cause the same to alter rotation of the control and reaction members after said relative rotative lost motion, and means responsive to actuation of said last named means to release said interconnecting means, whereby the driven element is driven in a different speed ratio, comprising coacting cam means rotatable respectively with said reaction and control members and operatively connected to said interconnecting means to release the same on said relative rotative motion of said last named members.

6. In a power transmission mechanism, a driving member, a driven element, means connected to the driving member to drive said element from said driving member in a predetermined speed ratio including a rotatable reaction member, planetary gearing carried by said element and driving members, including elements drivingly engaging the reaction member and driven element, said reaction member being adapted to have the rate of rotation thereof retarded, releasable means normally drivingly interconnecting said reaction and driving members whereby the driven element is driven in a predetermined speed ratio through said gearing upon normal interconnection of said members, means for retarding rotation of said reaction member comprising a brake member having limited lost motion rotation relative to the reaction member, brake means coacting with said brake member to brake and rotate the same a predetermined degree of said lost motion, and means responsive to actuation of said last named means to release said interconnecting means, whereby the driven element is driven in a different speed ratio, comprising coacting cam means rotatable respectively with said reaction and brake members and operatively connected to said interconnecting means to release the same on relative rotation of said last named members.

7. In a power transmission mechanism, a driving member, a driven element, means connected to the driving member to drive said element from said driving member in a predetermined speed ratio including a normally rotatable control member, meshing planetary gearing carried by said element and driving and control members, said control member being adapted to have the rate of rotation thereof retarded, and releasable clutch means drivingly interconnecting said control and driving members through said gearing, means for initiating relative rotation of said driving and control members, means responsive to actuation of said last named means and controlled by said relative rotation to release said clutch means, whereby the driven element is driven in a different speed ratio, and means to maintain said clutch means in released condition.

8. In a power transmission mechanism, a rotatable driving member, a rotatable driven shaft, means to drive said shaft from said member in a predetermined speed ratio, including a rotatable reaction member, a clutch device connecting the reaction member for normal rotation with the driving member, and planetary gearing carried by said shaft and driving member coacting with said reaction member to rotate the shaft through the gearing at a predetermined rate of speed during normal rotation of the reaction member, control means to alter the rate of rotation of said reaction member relative to the driving member so as to drive the shaft through said gearing in a different speed ratio, said control means including means responsive to operation of said control means to actuate said clutch device for relative rotation of the reaction and driving members, and means to maintain said clutch device in said actuated condition during said altered rate of rotation of the reaction and driving members.

9. In a power transmission mechanism, a rotatable driving member, a rotatable driven element, means to drive said element from said member in a predetermined speed ratio, including a rotatable reaction member, a clutch device connecting the reaction member for normal rotation with the driving member, and planetary gearing carried by said element and driving member coacting with said reaction member to rotate the element through the gearing at a predetermined rate of speed during normal rotation of the reaction member, control means to alter the rate of rotation of said reaction member relative to the driving member so as to drive the element through said gearing in a different speed ratio, said control means including means responsive to operation of said control means to actuate said clutch device for relative rotation of the reaction and driving members, and means to maintain said clutch device in said actuated condition during said altered rate of rotation of the reaction and driving members, comprising an element rotatable with the reaction member, and a brake element frictionally engageable with said last named element to prevent reverse action of said responsive means and consequent re-engagement of the clutch device, said brake element being actuable in predetermined timed relation to actuation of said control means for synchronized alteration of the reaction member speed and locking of the clutch device in actuated condition.

10. In a power transmission mechanism, a rotatable driving member, a rotatable driven element, means to drive said element from said member in a predetermined speed ratio, including a rotatable reaction member, a clutch device connecting the reaction member for normal rotation with the driving member, and planetary gearing carried by said element and driving member coacting with said reaction member to rotate the element through the gearing at a predetermined rate of speed during normal rotation of the reaction member, control means to retard the rate of rotation of said reaction member relative to the driving member so as to drive the element through said gearing in a different speed ratio, said control means comprising a control member having a lost motion driving connection to the reaction member for predetermined relative movement of the reaction and control members upon retardation of the latter, means to retard said control member, with consequent retardation of said reaction member following said lost motion rotation, and means responsive to and controlled by said lost motion rotation to release said clutch device.

11. In a power transmission mechanism, a rotatable driving member, a rotatable driven element, means to drive said element from said member in a predetermined speed ratio, including a rotatable reaction member, a clutch device connecting the reaction member for normal rotation with the driving member, and planetary gearing carried by said element and driving member coacting with said reaction member to rotate the element through the gearing at a predetermined rate of speed during normal rotation of the reaction member, control means to retard the rate of rotation of said reaction member relative to the driving member so as to drive the element through said gearing in a different speed ratio, said control means comprising a control member having a lost motion driving connection to the reaction member for predetermined relative movement of the reaction and control members upon retardation of the latter, means to retard said control member, with consequent retardation of said reaction member following said lost motion rotation, and means responsive to and controlled by said lost motion rotation to release said clutch device, and means to maintain said clutch device in said actuated condition during retardation of the reaction member.

12. In a power transmission mechanism, a rotatable driving member, a rotatable driven element, means to drive said element from said member in a predetermined speed ratio, including a rotatable reaction member, a clutch device connecting the reaction member for normal rotation with the driving member, and planetary gearing carried by said element and driving member coacting with said reaction member to rotate the element through the gearing at a predetermined rate of speed during normal rotation of the reaction member, control means to retard the rate of rotation of said reaction member relative to the driving member so as to drive the element through said gearing in a different speed ratio, said control means comprising a control member having a lost motion driving connection to the reaction member for predetermined relative movement of the reaction and control members upon retardation of the latter, means to retard said control member, with consequent retardation of said reaction member following said lost motion rotation, and means responsive to and controlled by said lost motion rotation to release said clutch device, and means to maintain said clutch device in said actuated condition during retardation of the reaction member, comprising an element rotatable with the reaction member, and a brake element frictionally engageable with said last named element to prevent reverse action of said responsive means and clutch device.

13. In a power transmission mechanism, a rotatable driving member, a rotatable driven member, means to drive said driven member from said driving member in a predetermined speed ratio, including a rotatable reaction element, a clutch device connecting the reaction element for normal rotation with one of said members, and planetary gearing carried by said members coacting with said reaction element to rotate the driven member through the gearing at a predetermined rate of speed during normal rotation of the reaction element, control means to retard the rate of rotation of said reaction element relative to the member with which it normally rotates so as to drive the driven member through said gearing in a different speed ratio, said control means comprising a control member having a lost motion driving connection to the reaction element for predetermined relative movement of the reaction element and control member upon retardation of the latter, means to retard said control member, with consequent retardation of said reaction element following said lost motion rotation, and means responsive to and controlled by said lost motion rotation to release said clutch device.

14. A driving and steering mechanism for track laying vehicle and related vehicles characterized by a pair of drivers disposed on opposite sides thereof, comprising a pair of driven members each adapted to be connected to and to independently drive one of the drivers of said vehicle, a common drive means and a pair of like, independent planetary units, each operatively connected to said common drive means and to one of said respective driven members, said planetary units being adapted to control said members independently of one another at like or differing speed ratios and each comprising a control element and means including an adjustable coupling device operable in response to and in overlappingly timed relation to operation of said control element to alter the drive ratio of the planetary unit.

15. A driving and steering mechanism for track laying vehicle and related vehicles characterized by a pair of drivers disposed on opposite sides thereof, comprising a pair of driven members each adapted to be connected to and to independently drive one of the drivers of said vehicle, a common drive means and a pair of like, independent planetary units, each operatively connected to said common drive means and to one of said respective driven members, said planetary units being adapted to control said members independently of one another at like or differing speed ratios and each comprising a releasable coupling device, a rotatable planetary control device, means to govern the speed of rotation of said control device, and means to automatically release said coupling device in response to and in overlappingly timed relation to the actuation of said governing means.

16. A driving and steering mechanism for track laying vehicle and related vehicles characterized by a pair of drivers disposed on opposite sides thereof, comprising a pair of driven members each adapted to be connected to and to independently drive one of the drivers of said vehicle, a common drive means and a pair of like, independent planetary units, each operatively connected to said common drive means and to one of said respective driven members, said planetary units being adapted to control said members independently of one another at like or differing speed ratios and each comprising a control element and means including an adjustable coupling device operable in response to operation of said control element to alter the drive ratio of the planetary unit.

17. A driving and steering mechanism as set forth in claim 16 in which said planetary units each includes reaction and planet gears, and in which said respective driven members are actuable unidirectionally or in reverse relative direction in accordance with the relative numbers of teeth of said planet and reaction gears.

18. A driving and steering mechanism as set forth in claim 16, in which said planetary units each includes means drivingly engaging said control element and in which said driven members are actuable unidirectionally or in reverse relative direction in accordance with the driving relationship of said last named means and said control element.

19. A driving and steering mechanism as set forth in claim 14, in which said planetary units each includes means drivingly engaging said control element and in which said driven members are actuable unidirectionally or in reverse relative direction in accordance with the driving relationship of said last named means and said control element.

20. A driving and steering mechanism for track laying and related vehicles characterized by a pair of drivers disposed on opposite sides thereof, comprising a pair of driven members each adapted to be connected to and to independently drive one of the drivers of said vehicle, a common drive means and a pair of like, independent planetary units, each operatively connected to said common drive means and to one of said respective driven members, said planetary units being adapted to control said members independently of one another at like or differing speed ratios and each comprising a rotatable control element normally driven at a predetermined rate of rotation by said common drive means, means to alter the rate of rotation of said control element, and means including an adjustable coupling device operable in response to operation of said last named means and the resultant alteration of the rate of rotation of said control element to alter the drive ratio of the planetary unit.

OSCAR H. BANKER.

REFERENCES CITED

The following references are of record in the file of this patent:

UNITED STATES PATENTS

| Number | Name | Date |
|---|---|---|
| 1,436,604 | Rackham | Nov. 21, 1922 |
| 1,758,806 | Saives | May 13, 1930 |
| 2,095,140 | Leeson | Oct. 5, 1937 |
| 2,159,983 | Colby | May 30, 1939 |
| 2,230,338 | Shaw | Feb. 4, 1941 |
| 2,230,339 | Shaw | Feb. 4, 1941 |
| 2,271,640 | Heintz | Feb. 3, 1942 |
| 2,378,082 | Hood | June 12, 1945 |

Certificate of Correction

Patent No. 2,486,815                                                                November 1, 1949

OSCAR H. BANKER

It is hereby certified that error appears in the printed specification of the above numbered patent requiring correction as follows:

Column 9, line 14, for "ring 147" read *ring 137*;

and that the said Letters Patent should be read with this correction therein that the same may conform to the record of the case in the Patent Office.

Signed and sealed this 21st day of March, A. D. 1950.

[SEAL]

THOMAS F. MURPHY,
*Assistant Commissioner of Patents.*